July 5, 1955
K. B. ANNERHED
2,712,332
CONVEYOR BELTS AND METHOD OF MAKING THEM
Filed May 19, 1952
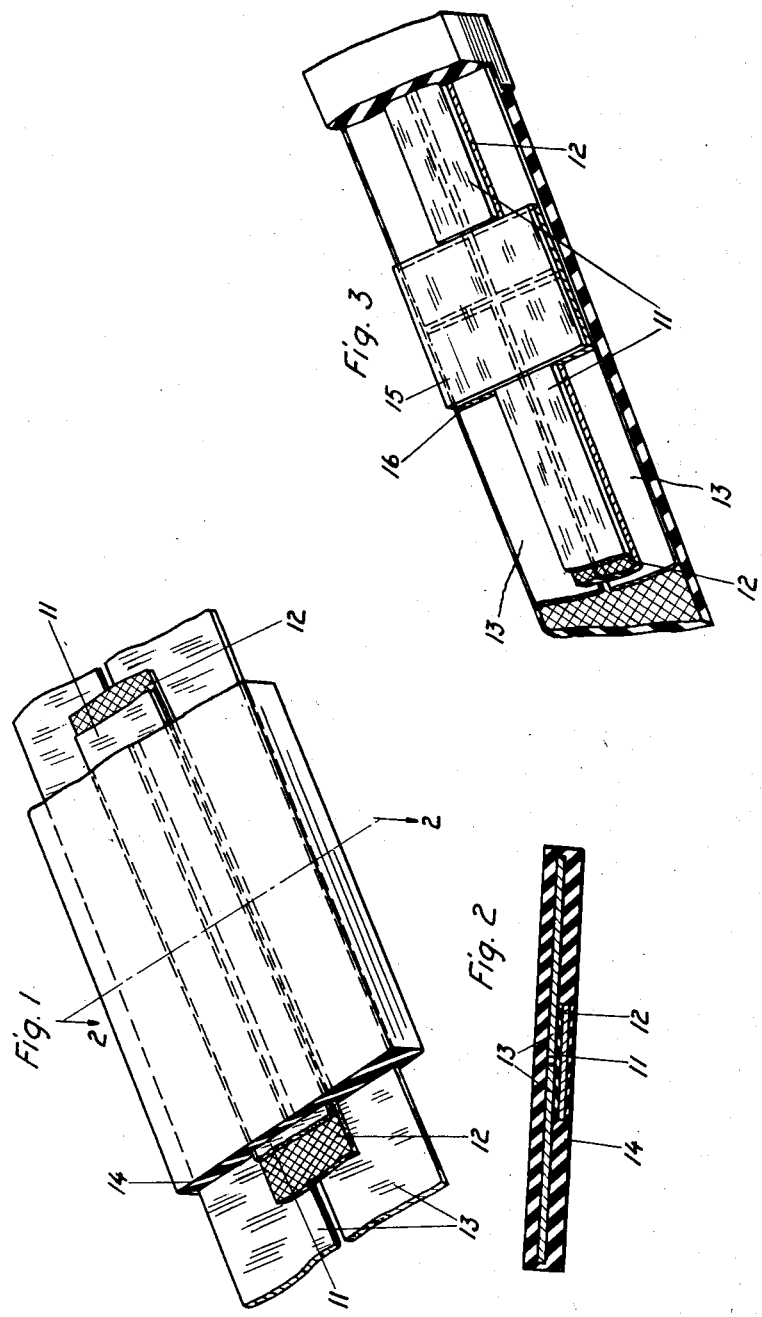
Inventor
Karl Bertil Annerhed
by
Pierce, Scheffler + Parker
his Attorneys

United States Patent Office 2,712,332
Patented July 5, 1955

2,712,332
CONVEYOR BELTS AND METHOD OF MAKING THEM

Karl Bertil Annerhed, Sandviken, Sweden, assignor to Sandvikens Jernverks Aktiebolag, Sandviken, Sweden, a corporation of Sweden Application May 19, 1952, Serial No. 288,660

Claims priority, application Sweden March 14, 1952

11 Claims. (Cl. 74—232)

This invention relates to conveyor belts formed of two or more parallel flat relatively narrow strips of sheet metal joined together side by side to give the desired width.

There is a growing need for steel conveyor belts having widths as great as 1.2 to 1.4 meters. Rolling mills generally are not equipped to produce sheet steel suitable for use in conveyor belts of a width greater than about 0.8 meters. A rolling mill capable of producing sheet steel 1.2 to 1.4 meters wide would be very expensive and besides the treatment of such wide strips to fit them for use as conveyor belts would be troublesome and difficult. In order to produce steel conveyor belts of widths greater than about 0.8 meters it is therefore expedient to join two or more narrower strips. Heretofore this has been done by securing the edges of the strips together by means of rivets but belts so made are not satisfactory because the metal is weakened adjacent the rivet holes and the belts are not sufficiently strong and durable. Also making wide belts in this way gives rise to a serious problem in making transverse joints between the ends of the strips inter alia on account of the difficulties in machining the cold rolled steel in the belts.

It has been proposed to make wide belts by welding or cementing together the overlapped edges of narrower strips but the resulting belts are not durable due particularly to the excessive strains set up when the double thickness of material makes the relatively sharp bends at the end pulleys. Welding of such steel belts gives rise to several difficult problems such as the difficulty in welding steel of such high carbon content.

An object of the present invention is to provide a wide belt and a method of making it from relatively narrow strips, which wide belt is free of the above mentioned difficulties and defects.

In accordance with my invention two or more steel strips are joined to produce a wide belt by positioning the strips side by side with their adjacent edges parallel and in contact or slightly spaced apart, covering the adjacent edges with a strip of elastic material such as sheet rubber, covering the strip of elastic material with a strip of sheet metal similar to the belt strips being joined and, if desired, covering the resulting composite structure with a layer of elastic material such as rubber which is then united to the elastic strip and to the metal strips by vulcanization or other treatment which is appropriate for the kind of elastic material used. The resulting structure is free of the strength defects of belts made by riveting and by cementing as described above and the method of production is economically advantageous. The strength of the two strips forming the belt is not lessened by the method of joining them but is supplemented by the strength of the third strip. Bending of the belt does not set up abnormal strains because the metal strips, due to the intervening layer of elastic material, are capable of sufficient relative movement to avoid such strains.

The above described method of forming the belt is also advantageous when it comes to forming transverse joints between the ends of strips, a transverse joint being formed by applying a strip of the elastic material and an overlying strip of sheet metal over the adjacent ends of the strips to be joined.

The elastic material used as the middle layer and as the cover may be natural or synthetic rubber, rubber-like silicone resins, rubber-like synthetic resins and plastics and the like. The thickness of the middle layer of elastic material should be within the range from 0.4 to 1.5 mm. preferably about 0.8 mm. The steel strips forming the belt usually have a thickness within the range from 0.6 to 2.0 mm. and the backing metal strip may be of the same or different thickness. The backing strip may be identical with the strips forming the belt or it may be of greater or less width than said strips.

A belt formed in accordance with the invention is illustrated in the accompanying drawings in which:

Fig. 1 is a bottom perspective view of a piece of belting with the layers broken away to reveal the structure of the belt;

Fig. 2 is a cross-section on the line of 2—2 of Fig. 1; and

Fig. 3 is a bottom perspective view of a piece of belting with the covering layer removed and revealing a transverse joint.

Referring to the drawing, 13 and 13 are the steel strips which are joined edge to edge to form the belt, 12 is the layer of elastic material covering the longitudinal joint between the strips, 11 is the metal strip which overlies the elastic strip 12 and 14 is the elastic covering which encloses the strips 11, 12, 13 and 13. The metal strips 11, 13 and 13 may be suitably treated prior to assembly, e. g. by pickling with sulfuric acid followed by washing with caustic soda solution to neutralize the acid or by sand blasting or such treatments may be omitted particularly when the strips present clean, smoth uncorroded surfaces. Special treatment may be employed to cause the elastic material, e. g. rubber, to adhere to the metal. The elastic intermediate layer 12 may be applied as a preformed strip or as a fluid coating. When applied as a preformed strip of rubber it may be in the vulcanized or unvulcanized state as applied and adhesion to the metal may be facilitated by the application of adhesive such as a vulcanizable rubber solution or other adhesive media to to contacting surfaces. The outer coating 14 may be applied as a preformed sheet or as a fluid coating. While it is desirable for the elastic intermediate layer 12 and the coating 14 to adhere to the metal, this is not essential but it is essential for the layer 12 and the coating 14 to adhere firmly to each other. The intermediate layer 12 and/or the cover 14 may be reinforced by the inclusion of fiber such as jute. Adhesion of the intermediate layer 12 and/or the cover 14 to the metal strips may be effected in any known manner such as by etching as described above or by coating the metal strips with copper or brass.

Referring to Fig. 3, it is seen that in making a transverse joint the ends of the steel strip 11 and of the layer 12 of elastic material are made to terminate at some distance short of the ends of the strips 13, 13 to be joined and the layer 16 of elastic material and the plate 15 of sheet steel are laid on the strips 13, 13 over their ends across the whole combined width of the strips 13, 13.

Within the scope of my invention the outer covering 14 may be used or not and various other changes in the embodiment illustrated and described may be made without departing from my invention as defined in the appended claims. For instance, the strips 11 and 13 need not be of the same length. In fact, it may be advantageous to use relatively short sections of the strip 11. As suggested above, more than two strips 13, i. e. three or more, may be joined to produce a belt of the desired width and these strips need not be of the same width. Other means may be employed for joining the ends of the strips 13. For instance, to increase the tensile strength of the belt and particularly of the transverse joints, the joints between the ends of each strip 13 and between the ends of the strip 11 may be staggered.

I claim:

1. A conveyor belt comprising at least two relatively long and narrow flexible strips of sheet steel, each of said strips being of uniform width, the longer edges of said strips being rectilinear when said strips lie in a plane and said strips being positioned lengthwise of the belt and parallel to each other with a longer edge of each strip contiguous to a longer edge of another strip and so that the intersection of said strips with a plane perpendicular to said longer edges is a straight line, a relatively long and narrow strip of elastic material of uniform width extending longitudinally of the belt and overlying contiguous edge portions of two sheet steel strips, a relatively long and narrow sheet steel strip of uniform width extending lengthwise of the belt and overlying said strip of elastic material and a cover of elastic material enclosing all of said strips.

2. A conveyor belt as defined in claim 1 in which the belt is continuous and the contiguous end portions of said parallel steel strips are covered by a strip of elastic material and by a superposed strip of sheet steel extending across the belt.

3. A conveyor belt as defined in claim 1 in which the belt is continuous, each of said parallel steel strips is discontinuous and has its opposite ends positioned contiguous to each other, the overlying strips of elastic material and sheet steel terminate at a short distance from the ends of said parallel steel strips and a strip of elastic material and an overlying sheet steel strip extend across the belt over the contiguous end portions of said parallel steel strips.

4. A conveyor belt as defined in claim 1 in which the cover is adhesively attached to the edges of the strip of elastic material.

5. A conveyor belt as defined in claim 1 in which the strip of elastic material and the cover consist of vulcanized rubber composition.

6. A conveyor belt as defined in claim 1 in which the parallel steel strips have a thickness within the range from 0.6 mm. to 2 mm. and the strip of elastic material has a thickness within the range from 0.4 to 1.5 mm.

7. A method of forming a conveyor belt which comprises laying at least two flexible steel strips each of uniform width and having straight edges when lying in a plane side by side with their adjacent longitudinal edges contiguous to each other and so that the intersection thereof with a plane perpendicular to said edges is a straight line, covering the contiguous longitudinal edge portions of said strips with a strip of elastic material, superposing a strip of steel on said strip of elastic material and covering the resulting assembly with an outer layer of elastic material.

8. A method as defined in claim 1 in which the outer layer of elastic material is adhesively attached to the strip of elastic material.

9. A method as defined in claim 7 in which the strip of elastic material is applied in the form of a preformed strip.

10. A method as defined in claim 7 in which the strip of elastic material is applied in the form of a fluid coating.

11. A method of forming a contiguous conveyor belt which comprises laying at least two discontinuous steel strips side by side with their adjacent edges contiguous to each other and their free ends contiguous to each other and so that the intersection of said strips with a plane perpendicular to said adjacent edges is a straight line, covering the contiguous edge portions of said strips with a strip of elastic material, covering the contiguous end portions of said strips with a strip of elastic material, covering each of said strips of elastic material with a steel strip and covering the resulting assembly with a layer of elastic material.

References Cited in the file of this patent

UNITED STATES PATENTS

| | | |
|---|---|---|
| 2,231,529 | Dey | Feb. 11, 1941 |
| 2,430,024 | Luaces et al. | Nov. 4, 1947 |
| 2,545,370 | Mittelmann | Mar. 13, 1951 |
| 2,621,528 | Luaces et al. | Dec. 16, 1952 |

FOREIGN PATENTS

| | | |
|---|---|---|
| 454,134 | Canada | Jan. 18, 1949 |